United States Patent
Wang

(10) Patent No.: US 8,539,129 B2
(45) Date of Patent: Sep. 17, 2013

(54) BUS ARBITRATION TECHNIQUES TO REDUCE ACCESS LATENCY

(75) Inventor: Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 12/760,298

(22) Filed: Apr. 14, 2010

(65) Prior Publication Data

US 2011/0258353 A1    Oct. 20, 2011

(51) Int. Cl.
G06F 12/00    (2006.01)
G06F 13/14    (2006.01)
G06F 13/18    (2006.01)

(52) U.S. Cl.
USPC ............................ 710/244; 710/110; 711/151

(58) Field of Classification Search
USPC ................. 710/110, 240, 241, 244; 711/147, 711/150, 151
See application file for complete search history.

(56) References Cited

U.S. PATENT DOCUMENTS

| | | | |
|---|---|---|---|
| 6,564,304 B1 * | 5/2003 | Van Hook et al. | 711/154 |
| 7,127,573 B1 | 10/2006 | Strongin et al. | |
| 7,581,073 B2 | 8/2009 | Gower et al. | |
| 2003/0033493 A1 | 2/2003 | Cismas | |
| 2004/0139286 A1 * | 7/2004 | Lin et al. | 711/151 |
| 2005/0097265 A1 | 5/2005 | Shrader et al. | |
| 2008/0162852 A1 * | 7/2008 | Kareenahalli et al. | 711/167 |
| 2009/0016137 A1 | 1/2009 | Hur et al. | |
| 2009/0063791 A1 | 3/2009 | Cho | |
| 2009/0177822 A1 * | 7/2009 | Adar et al. | 710/110 |
| 2009/0204771 A1 | 8/2009 | Kawamoto et al. | |
| 2010/0115167 A1 * | 5/2010 | Tardieux et al. | 710/240 |
| 2010/0312944 A1 * | 12/2010 | Walker | 711/5 |
| 2011/0258354 A1 * | 10/2011 | Wang | 710/114 |

OTHER PUBLICATIONS

International Search Report and Written Opinion—PCT/US2011/032544, ISA/EPO—Jun. 22, 2011.
Wang et al., "Mehods of Bus Arbitration of Low Power Memory Access", U.S. Appl. No. 12/760,240, filed Apr. 14, 2010, 28 of pages.

* cited by examiner

*Primary Examiner* — Thomas J Cleary
(74) *Attorney, Agent, or Firm* — Sam Talpalatsky; Nicholas J. Pauley; Joseph Agusta

(57) ABSTRACT

A method of arbitrating requests from bus masters for access to shared memory in order to reduce access latency, comprises looking ahead into currently scheduled requests to the shared memory and predicting latency of the requests based on characteristics of the currently scheduled requests, such as increasing page hit rate, or balancing read and write traffic. The requests are scheduled based at least in part on the predicted latency.

14 Claims, 3 Drawing Sheets

Conventional Scheme

BUS ARBITRATION TECHNIQUES TO REDUCE ACCESS LATENCY

REFERENCE TO CO-PENDING APPLICATIONS FOR PATENT

The present application for patent is related to the following co-pending U.S. patent applications: "METHODS OF BUS ARBITRATION FOR LOW POWER MEMORY ACCESS" by Wang Feng, having U.S. patent application Ser. No. 12/760,240, filed concurrently herewith, assigned to the assignee hereof, and expressly incorporated by reference herein.

FIELD OF DISCLOSURE

Disclosed embodiments are related to bus arbitration techniques. In particular, disclosed embodiments are directed towards techniques to reduce memory access latency in shared memory systems.

BACKGROUND

System architectures with shared memory structures are well known in the art. A shared or global memory space may be accessed by multiple processors or processing elements through a bus or interconnect system. The processing elements are notionally referred to as "bus masters" of the interconnect system, and the shared memory structure resides at the "slave" end. The bus masters make read/write requests to the shared memory resource. The requests are serviced by "memory controllers" at the slave end. In general, the memory controllers complete a point to point connection between a bus master and the common memory space in the interconnect system, in order to facilitate the transfer of data.

It is quite common for multiple bus masters to compete with one another for accessing the shared memory space, since only one access request may be serviceable at any given time. Therefore, access of the shared memory is synchronized such that a bus master is not granted access, while another bus master is being serviced. Scheduling mechanisms or "arbitration schemes" are employed to synchronize and schedule requests from different bus masters in order to avoid contentions. A "bus arbiter" performs the task of arbitration.

A bus arbiter decides which bus master may be granted access to the memory at any given time. When two or more bus masters attempt to access the bus concurrently, only one is granted access, while the other processors must wait. One of the challenges faced by arbiters is ensuring that prioritizing certain bus masters to enable them to access the memory does not cause bus masters with lower priority to get locked out indefinitely or suffer unreasonable delays in gaining access.

A common arbitration scheme is a round robin arbitration scheme, wherein the available bandwidth is allocated evenly among all the bus masters. Memory access is granted according to a predetermined order without regard to latency requirements of individual bus masters. For example, a Digital Signal Processor (DSP) processing voice communications may require low latency communications, but a basic round robin scheme may prove to be very inefficient in accommodating such latency characteristics.

Another well known approach is a token based approach wherein a "token" is passed around the network and only a bus master possessing the token may be allowed access. If a particular processing element does not require access, it may pass the token on to a neighbor. Notions of priority and latency requirements are built into implementations of such schemes. A token based arbitration scheme attempts to guarantee latency requirements by allocating priority based on latency characteristics of the bus masters.

However, these and other well known arbitration schemes do not take into account the transactions at the slave end of the interconnect system. Consider for example, a memory system employing a conventional arbitration scheme. A bus arbiter in the memory system grants access to a first bus master at a particular instance in time. The requested data resides in a first page of the memory, which remains open for the duration of access by the first bus master. Next, a second bus master is granted access. But the second bus master requests data which misses in the first page and a page miss occurs. Considerable delay is incurred in fetching a second page which contains the requested data. Access is then granted to a third bus master that requests data in the first page, and yet another page miss is suffered while the first page is fetched.

In the above example, if the bus arbiter had scheduled the requests differently, such that the first and third transactions, accessing the same page, are scheduled consecutively, it would have resulted in a page hit for the third transaction. But existing techniques are not capable of looking ahead to predict transactions which would result in page hits.

Accordingly, there is a need in the art for techniques wherein memory access latency can be reduced, by taking into consideration the scheduled transactions at the slave end in order to improve page hit rate and balance reads and writes.

SUMMARY

Exemplary embodiments are directed to systems and method for arbitrating techniques to reducing access latency of memory transactions in a shared memory system.

For example, exemplary embodiments are directed to a method of arbitrating requests from bus masters for access to shared memory in a processing system comprising looking ahead into currently scheduled accesses to the shared memory, predicting latency of the requests from bus masters based on a characteristic of the currently scheduled accesses, and scheduling the requests from bus masters based at least in part on the predicted latency.

Another exemplary embodiment is directed to a processing system comprising a shared memory system, bus masters configured to generate future requests to access the shared memory system, memory controllers configured to service currently scheduled requests, latency predictors configured to predict latency based on a characteristic of currently scheduled requests by the memory controller and arbiters configured to select at least a subset of the future requests based at least in part on the predicted latency.

Yet another exemplary embodiment is directed to a processing system for arbitrating requests from bus masters for access to shared memory comprising means for looking ahead into currently scheduled accesses to the shared memory, means for predicting latency of the requests from bus masters based on a characteristic of the currently scheduled accesses and means for scheduling the requests from bus masters based at least in part on the predicted latency.

Exemplary embodiments are also directed to method of arbitrating requests from bus masters for access to shared memory in a processing system comprising step for looking ahead into currently scheduled accesses to the shared memory, step for predicting latency of the requests from bus masters based on a characteristic of the currently scheduled accesses and step for scheduling the requests from bus masters based at least in part on the predicted latency.

BRIEF DESCRIPTION OF THE DRAWINGS

The accompanying drawings are presented to aid in the description of embodiments and are provided solely for illustration of the embodiments and not limitation thereof.

DETAILED DESCRIPTION

Aspects of the invention are disclosed in the following description and related drawings directed to specific embodiments. Alternate embodiments may be devised without departing from the scope of the invention. Additionally, well-known elements of the various embodiments will not be described in detail or will be omitted so as not to obscure the relevant details of the various embodiments.

The word "exemplary" is used herein to mean "serving as an example, instance, or illustration." Any embodiment described herein as "exemplary" is not necessarily to be construed as preferred or advantageous over other embodiments. Likewise, the term "embodiments" or "embodiments of the invention" does not require that all embodiments include the discussed feature, advantage or mode of operation.

The terminology used herein is for the purpose of describing particular embodiments only and is not intended to be limiting of various embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
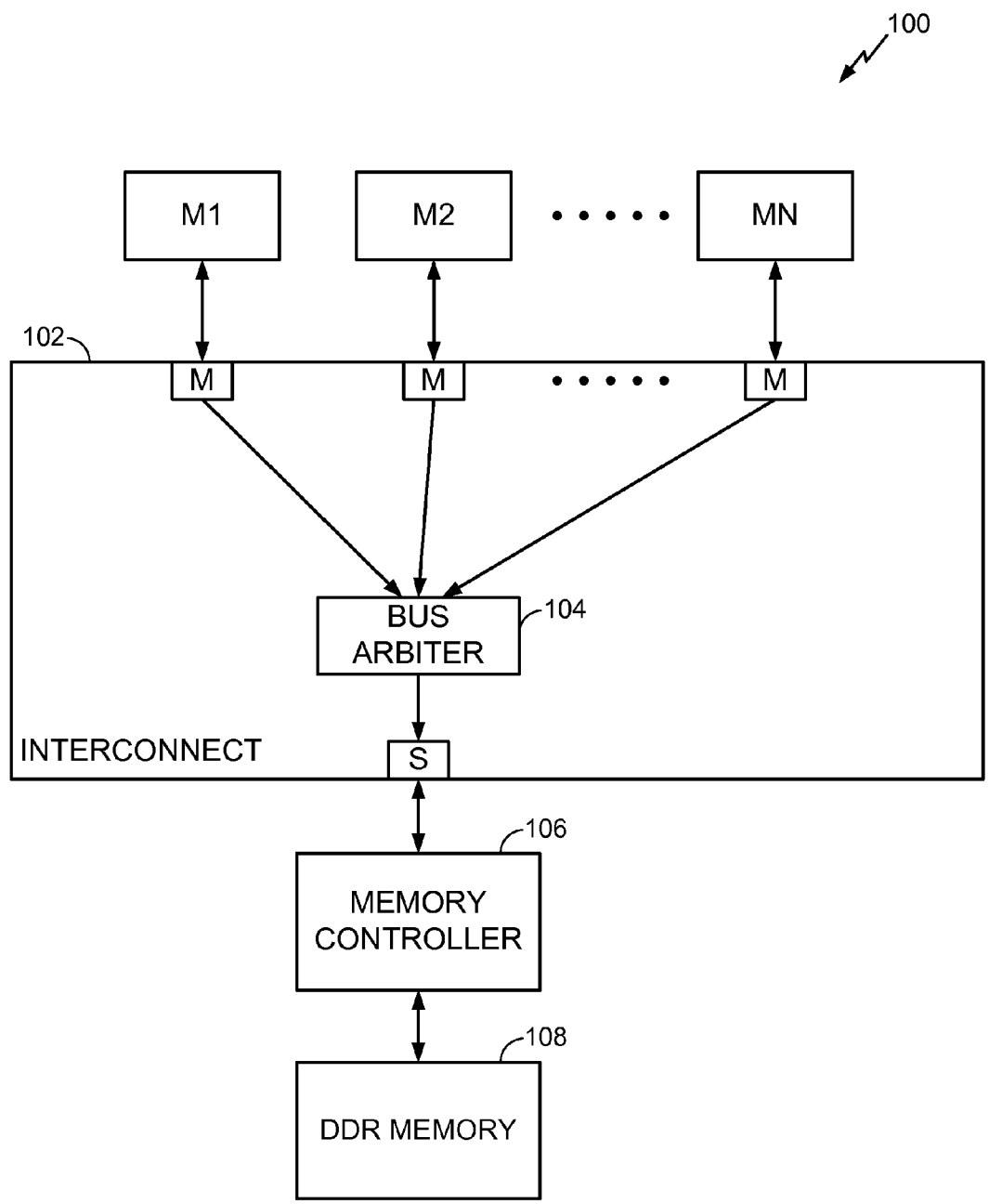
FIG. 1 illustrates a conventional shared memory system

FIG. 1 illustrates a conventional shared memory system 100. Bus masters M1-MN make memory access requests through the medium of interconnect 102. Bus Arbiter 104 schedules the requests according to techniques such as round robin or token based scheduling. Slave memory controller 106 services the scheduled requests by communicating with a shared memory resource, such as Double Data Rate (DDR) Memory 108, as shown. Sometimes memory controller 106 maintains a queue, wherein scheduled transactions are maintained before they are serviced. Bus Arbiter 104 may try to accommodate latency requirements of bus masters M1-MN by assigning higher priority to bus masters with low latency requirements. However, system 100 does not take into consideration the context of scheduled transactions or latency implications of page misses in the scheduling process.

Figure 2:
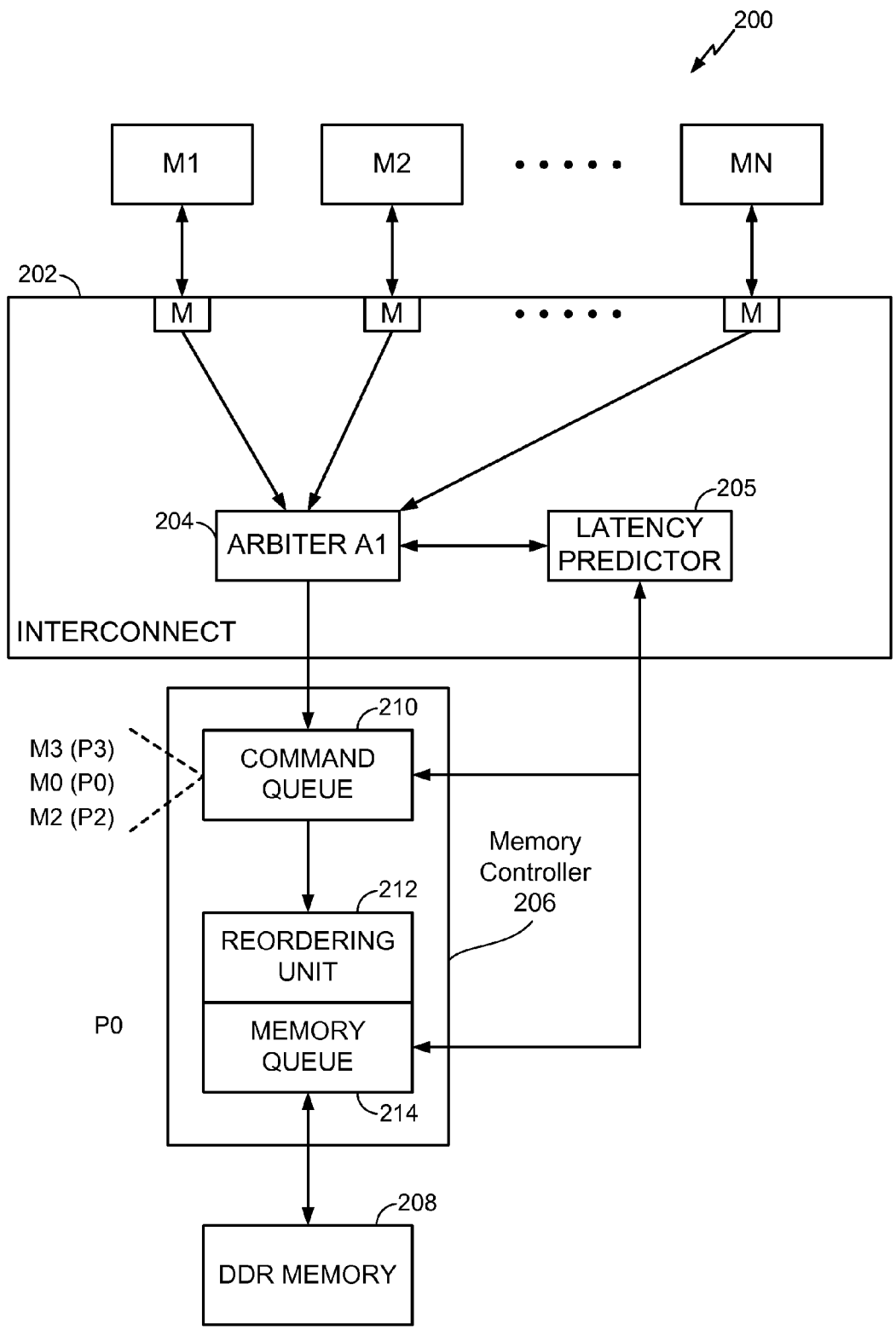
FIG. 2 illustrates a shared memory system with improvements for bus arbitration techniques based on memory access latency according to exemplary embodiments.

According to the inventive techniques described herein, the arbitration process is based at least in part on latency predictions derived from currently scheduled memory transactions. FIG. 2 illustrates an exemplary embodiment. In addition to the components of a conventional system such as system 100, memory system 200 includes a latency predictor 205. The latency predictor 205 communicates information regarding currently scheduled transactions to bus arbiter 204. Memory controller 206 includes a command queue 210, a reordering unit 212 and a memory queue 214 as shown. The operation and details of these components will be described below in the context of a non-limiting illustrative example.

Assume that initial conditions reflect no currently scheduled memory transactions. As described previously, the bus arbiter 204 receives memory access requests from bus masters M1-MN, and selects at least a subset of the requests to be scheduled for memory access. In the example, the arbiter 204 selects memory requests from M2, M0 and M3 to be scheduled. The request from M2 is scheduled to be serviced first, M0 is next and M3 is last. Based on the memory addresses of the requests, it is known that servicing these requests will require access to pages P3, P0 and P2 respectively in shared memory 208. In general, the selected requests enter the command queue 210, pass through the reordering unit 212 and enter the memory queue 214.

Memory queue 214 is a staging area that holds the transaction that is currently being serviced. In the event that servicing the transaction in memory queue 214 brings up page P0 in memory 208, scheduling a request for page P2 next (corresponding to M2) would result in a page miss. One of ordinary skill will understand that page misses result in additional delay, and such delays are especially disadvantageous to bus masters with low latency characteristics.

However, by reordering the selected requests in the command queue 210, such that the request from M0 is scheduled first, would necessitate the access of page P0, resulting in a page hit. The reordering unit 212 performs the function of reordering selected requests out of the order they were received from the command queue 210, such that the reordering will result in a lower latency than servicing the requests in order from the command queue 210. The reordering unit 212 acts in conjunction with latency predictor 205 for reordering selected requests in the memory controller 206.

Latency predictor 205 looks ahead into memory queue 214 to determine the current request being serviced and the corresponding page in the memory. The latency predictor 205 then checks the command queue 210 to determine whether a selected request in the command queue 210 would result in a page hit. If there exists such a scheduled transaction (for example request for page P0 from bus master M0), and it is not the first in line, then the reordering unit 212 takes the request out of line and schedules it next for memory access in the memory queue 214. Accordingly, priority for memory access is assigned to selected requests in the memory controller leading to low overall latency, based on page hit rate.

When the system reaches a steady state mode of operation wherein an initial set of selected requests are in the scheduling pipeline of the memory controller 206, the latency predictor 205 develops useful information for future requests from bus masters M1-MN to the bus arbiter 204. The latency predictor 205 communicates information regarding the expected latency of transactions in the slave side memory controller 206 to the bus arbiter 204. The bus arbiter 204 is now equipped with this information in arbitrating and scheduling the future memory requests from bus masters M1-MN. The bus arbiter weighs priority values assigned to the memory requests according to conventional arbitration schemes alongside predicted latency values of the memory requests based on the information from the latency predictor 205. A consolidated priority value is generated for each memory request, and they are scheduled accordingly.

It will be understood that the above description of initial conditions and steady state mode of operation is for illustrative purposes only, and the system is not limited to waiting for a predetermined number of selected requests to be scheduled before utilizing latency prediction information in arbitrating future requests. In yet another exemplary embodiment, the latency predictor 205 also takes into account information regarding read and write requests, to assist in balancing read and write accesses serviced by the slave memory controller 206. Skilled persons will appreciate the value of balancing read and write traffic on system buses to manage the load efficiently.

Figure 3:
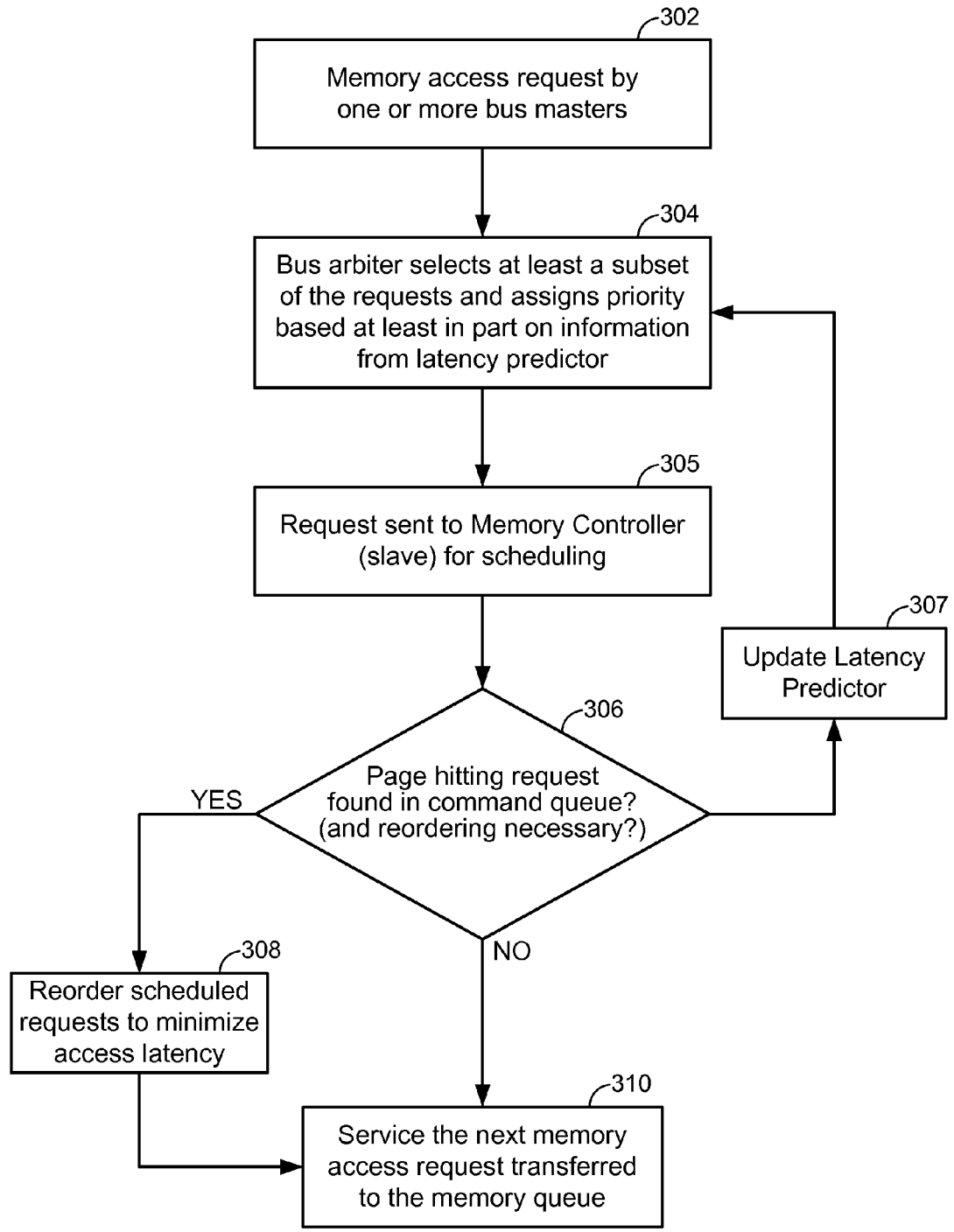
FIG. 3 is a flow chart depicting the inventive techniques according to an exemplary embodiment.

FIG. 3 illustrates a flow chart depicting the inventive techniques in steady state according to an exemplary embodiment. Memory access requests are made by bus masters M1-MN at block 302. At block 304, bus arbiter 204 selects at least a subset of the requests and assigns priority to the requests based at least in part on latency predictions from latency predictor 205. At block 305, the selected requests are sent to the slave memory controller 206 for scheduling. At block 306, it is determined by looking ahead into the memory queue 214, and the requests in the command queue 210 whether any of the requests scheduled in the command queue would result in a page hit if scheduled next. The latency predictor 205 is updated with this information, at block 307. If it is determined that scheduling a request out of order from the command queue would result in a page miss, the reordering unit sends the request out of order to the memory queue to be scheduled next (block 308). If on the other hand, it is determined that none of the scheduled requests in the command queue would result in a page hit, then the schedule is maintained. At block 310, the memory request is staged for memory access in the memory queue 214.

The disclosed embodiments provide advantages over conventional arbitration schemes, by facilitating memory scheduling while providing more transactions which can be scheduled, leading to smaller memory access latency and better read-write balances. Accordingly, bus arbitration schemes that schedule requests with a view to improving page hit rate, also improve the bandwidth utilization of the memory system.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment can include a computer readable media embodying a method for bus arbitration to reduce memory access latency. Accordingly, the various embodiments are not limited to illustrated examples and any means for performing the functionality described herein are included in the various embodiments.

While the foregoing disclosure shows illustrative embodiments, it should be noted that various changes and modifications could be made herein without departing from the scope of the invention as defined by the appended claims. The functions, steps and/or actions of the method claims in accordance with the embodiments described herein need not be performed in any particular order. Furthermore, although elements of the various embodiments may be described or claimed in the singular, the plural is contemplated unless limitation to the singular is explicitly stated.

What is claimed is:

1. A method of arbitrating requests from bus masters for access to shared memory in a processing system comprising:
    looking ahead into currently scheduled accesses to the shared memory;
    predicting latency of the requests from bus masters based on a characteristic of the currently scheduled accesses, wherein the characteristic of a currently scheduled access is a page of the shared memory which needs to be accessed in order to service a corresponding request;
    assigning priority values to the requests based on latency requirements of corresponding bus masters which generated the requests;
    generating consolidated priority values for the requests based on the assigned priority values and the predicted latency values; and
    scheduling the requests from bus masters based at least in part on the consolidated priority values.

2. The method of claim 1, wherein scheduling the requests from bus masters based at least in part on the predicted latency comprises scheduling the requests from bus masters to increase page hit rate.

3. The method of claim 1, wherein scheduling the requests from bus masters based at least in part on the predicted latency comprises selecting a subset of the requests from bus masters.

4. The method of claim 3 further comprising reordering the selected subset of the requests at a slave side of the computing system before commencing access to the shared memory.

5. A processing system comprising:
- a shared memory system;
- a bus master configured to generate requests to access the shared memory system;
- a memory controller configured to service currently scheduled accesses;
- a latency predictor configured to predict latency of the requests based on a characteristic of currently scheduled accesses, wherein the characteristic of a currently scheduled access is a page of the shared memory which needs to be accessed in order to service a corresponding request; and
- an arbiter configured to configured to assign priority values to the requests based on latency requirements of corresponding bus masters which generated the requests, generate consolidated priority values for the requests based on the assigned priority values and the predicted latency values and schedule requests from the bus masters based at least in part on the consolidated priority values.

6. The processing system of claim 5, wherein the arbiter is configured to select at least a subset of the future requests based at least in part on the predicted latency such that the selected subset increases a page hit rate.

7. The processing system of claim 5 wherein the memory controller further comprises:
- a command queue for storing the selected requests in the order the requests are received from the arbiters;
- a reordering unit for reordering the order of requests stored in the command queue, such that a page hit rate is increased; and
- a memory queue for staging current accesses to the shared memory.

8. A processing system for arbitrating requests from bus masters for access to shared memory comprising:
- means for looking ahead into currently scheduled accesses to the shared memory;
- means for predicting latency of the requests from bus masters based on a characteristic of the currently scheduled accesses, wherein the characteristic of a currently scheduled access is a page of the shared memory which needs to be accessed in order to service a corresponding request;
- means for assigning priority values to the requests based on latency requirements of corresponding bus masters which generated the requests;
- means for generating consolidated priority values for the requests based on the assigned priority values and the predicted latency values; and
- means for scheduling the requests from bus masters based at least in part on the consolidated priority values.

9. The processing system of claim 8, wherein means for scheduling the requests from bus masters based at least in part on the predicted latency comprises means for scheduling the requests from bus masters to increase page hit rate.

10. The processing system of claim 8 wherein the means for scheduling the requests from the bus masters based at least in part on the predicted latency further comprises means for selecting a subset of the requests from bus masters and means for reordering the selected subset of the requests at a slave side of the computing system before commencing access to the shared memory.

11. A method of arbitrating requests from bus masters for access to shared memory in a processing system comprising:
- step for looking ahead into currently scheduled accesses to the shared memory;
- step for predicting latency of the requests from bus masters based on a characteristic of the currently scheduled accesses, wherein the characteristic of a currently scheduled access is a page of the shared memory which needs to be accessed in order to service a corresponding request;
- step for assigning priority values to the requests based on latency requirements of corresponding bus masters which generated the requests;
- step for generating consolidated priority values for the requests based on the assigned priority values and the predicted latency values; and
- step for scheduling the requests from bus masters based at least in part on the consolidated priority values.

12. The method of claim 11, wherein step for scheduling the requests from bus masters based at least in part on the predicted latency comprises step for scheduling the requests from bus masters to increase page hit rate.

13. The method of claim 11, wherein the step for scheduling the requests from the bus masters based at least in part on the predicted latency further comprises step for selecting a subset of the requests from bus masters and step for reordering the selected subset of the requests at a slave side of the computing system before commencing access to the shared memory.

14. A non-transitory computer-readable storage medium comprising code, which, when executed by a processor, causes the processor to perform operations for arbitrating requests from bus masters for access to shared memory in the processor, the non-transitory computer-readable storage medium comprising:
- code for looking ahead into currently scheduled accesses to the shared memory;
- code for predicting latency of the requests from bus masters based on a characteristic of the currently scheduled accesses, wherein the characteristic of a currently scheduled access is a page of the shared memory which needs to be accessed in order to service a corresponding request;
- code for assigning priority values to the requests based on latency requirements of corresponding bus masters which generated the requests;
- code for generating consolidated priority values for the requests based on the assigned priority values and the predicted latency values; and
- code for scheduling the requests from bus masters based at least in part on the consolidated priority values.

* * * * *